United States Patent
Akiyoshi et al.

(10) Patent No.: US 9,413,207 B2
(45) Date of Patent: Aug. 9, 2016

(54) VENTILATION STRUCTURE FOR AC GENERATOR

(71) Applicant: Mitsubishi Electric Corporation, Chiyoda-ku, Tokyo (JP)

(72) Inventors: Masao Akiyoshi, Tokyo (JP); Kazuya Hasegawa, Tokyo (JP); Atsushi Ohashi, Tokyo (JP); Kazunori Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/258,156

(22) Filed: Apr. 22, 2014

(65) Prior Publication Data

US 2015/0137633 A1   May 21, 2015

(30) Foreign Application Priority Data

Nov. 21, 2013   (JP) .................. 2013-240533

(51) Int. Cl.
*H02K 9/06* (2006.01)
*H02K 9/02* (2006.01)
*H02K 9/08* (2006.01)
*H02K 9/12* (2006.01)
(Continued)

(52) U.S. Cl.
CPC .. *H02K 9/06* (2013.01); *H02K 5/20* (2013.01); *H02K 9/02* (2013.01); *H02K 9/04* (2013.01); *H02K 9/08* (2013.01); *H02K 9/12* (2013.01)

(58) Field of Classification Search
CPC ............. H02K 9/06; H02K 9/00; H02K 5/20; H02K 9/005; H02K 9/02; H02K 9/04; H02K 9/08; H02K 9/10; H02K 9/12; H02K 9/14; H02K 9/16

USPC ........................................ 310/58, 60 R, 52, 62
See application file for complete search history.

(56) References Cited

U.S. PATENT DOCUMENTS 2,512,905 A * 6/1950 Willits ............................ 310/62
3,670,190 A * 6/1972 Goebel ....................... 310/60 R
3,800,173 A * 3/1974 Rosenberry, Jr. ............... 310/59

(Continued)

FOREIGN PATENT DOCUMENTS

GB          746014      * 3/1956
JP     2001-169507 A    6/2001

(Continued)

OTHER PUBLICATIONS

Braun, Horst; Reidel, Georg; Electrical Machine in particular three phase generator; Bosch Gmbh, Apr. 3, 2008; WO2008037294.*

(Continued)

*Primary Examiner* — Terrance Kenerly
*Assistant Examiner* — Alexander Singh
(74) *Attorney, Agent, or Firm* — Sughrue Mion, PLLC; Richard C. Turner (57) ABSTRACT

A vehicle AC generator capable of enhancing a cooling effect by increasing an air volume of cooling air is obtained. The AC generator includes: a casing having a ventilation port on an outer periphery; a stator installed in the casing; a rotor supported in the stator in a rotatable manner; a fan installed oppositely to the ventilation port in the casing and rotated integrally with the rotor; and a protrusion formed on a surface of the casing opposing a tip end of the fan at a position adjacent to an outer periphery of the ventilation port of the casing.

10 Claims, 6 Drawing Sheets

(51) Int. Cl.
*H02K 9/04* (2006.01)
*H02K 5/20* (2006.01)

(56) References Cited

U.S. PATENT DOCUMENTS

| | | | | |
|---|---|---|---|---|
| 5,777,407 | A | * | 7/1998 | Ishida et al. .................... 310/64 |
| 6,386,843 | B1 | | 5/2002 | Umeda et al. |
| 2003/0137201 | A1 | * | 7/2003 | Nakano ....................... 310/68 D |
| 2011/0148366 | A1 | * | 6/2011 | Iwamoto et al. ................ 322/28 |

FOREIGN PATENT DOCUMENTS

| | | |
|---|---|---|
| JP | 2002-136039 A | 5/2002 |
| WO | 2008/037294 A1 | 4/2008 |
| WO | WO 2008037294 A1 * | 4/2008 |

OTHER PUBLICATIONS

Communication dated Nov. 11, 2014, issued by the Japanese Patent Office in counterpart Japanese application No. 2013-240533.

* cited by examiner

VENTILATION STRUCTURE FOR AC GENERATOR

BACKGROUND OF THE INVENTION

1. Field of the Invention

The present invention relates to an AC generator, and more particularly, to a vehicle AC generator that charges an in-vehicle battery and supplies an in-vehicle electric device with power.

2. Description of the Related Art

In a vehicle AC generator in the related art, as described in International Publication No. WO 2008-037294, a suction port of a fan provided to a bracket has a circular cross section. A diameter of the suction port decreases smoothly toward the fan and then gradually increases to a position adjacent to the fan in closest proximity.

In the vehicle AC generator in the related art, however, because the diameter of the suction port gradually increases toward the fan, a range in which momentum is given to the cooling air by the fan is reduced and so is an amount of pressure rise by the fan.

Consequently, even when a pressure loss at an outlet port side of the fan is lessened by providing a space at the tip end of the fan, the vehicle AC generator in the related art has a problem that an increase in air volume of cooling air decreases in a case where there is a certain amount of pressure loss in an air passage upstream of the fan.

Also, a pressure of airflow flowing out from the fan is high whereas a pressure is low in the vicinity of the suction port of the fan. Hence, a leakage flow of the cooling air is generated in a space in the vicinity of the tip end of the fan from downstream of the fan to the suction port of the fan. However, because the structure is such that the suction port of the fan gradually expands to the position adjacent to the fan in closest proximity, resistance against the leakage flow of the cooling air is so low that a flow rate of the leakage flow of the cooling air readily increases. Given that an amount of work by the fan is constant, an air volume of the discharged cooling air decreases when there is a considerable leakage flow of the cooling air.

[Patent Document 1] International Publication No. WO 2008/037294

As has been described, the vehicle AC generator in the related art described in Patent Document 1 has a problem that a temperature of a component that needs cooling by airflow generated by the fan rises due to a decrease in air volume of the cooling air.

SUMMARY OF THE INVENTION

The invention was devised to solve the problems of the AC generator in the related discussed above, and has an object to enhance a cooling effect on a stator winding and rectifier elements by lessening a pressure loss in an air passage of airflow generated by a fan of a vehicle AC generator and also by increasing an air volume of cooling air.

An AC generator according to an aspect of the invention includes: a casing having a ventilation port on an outer periphery; a stator installed in the casing; a rotor supported in the stator in a rotatable manner; a fan installed oppositely to the ventilation port in the casing and rotated integrally with the rotor; and a protrusion formed on a surface of the casing opposing a tip end of the fan at a position adjacent to an outer periphery of the ventilation port of the casing.

According to the AC generator configured as above, by providing the protrusion on a surface of the casing opposing the tip end of the fan at a position adjacent to the outer periphery of the ventilation port of the casing, an area of an air passage of the cooling air can be increased and hence an air volume generated by the fan can be increased. It thus becomes possible to enhance a cooling effect on a stator winding and rectifier elements in the AC generator.

The foregoing and other objects, features, aspects, and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
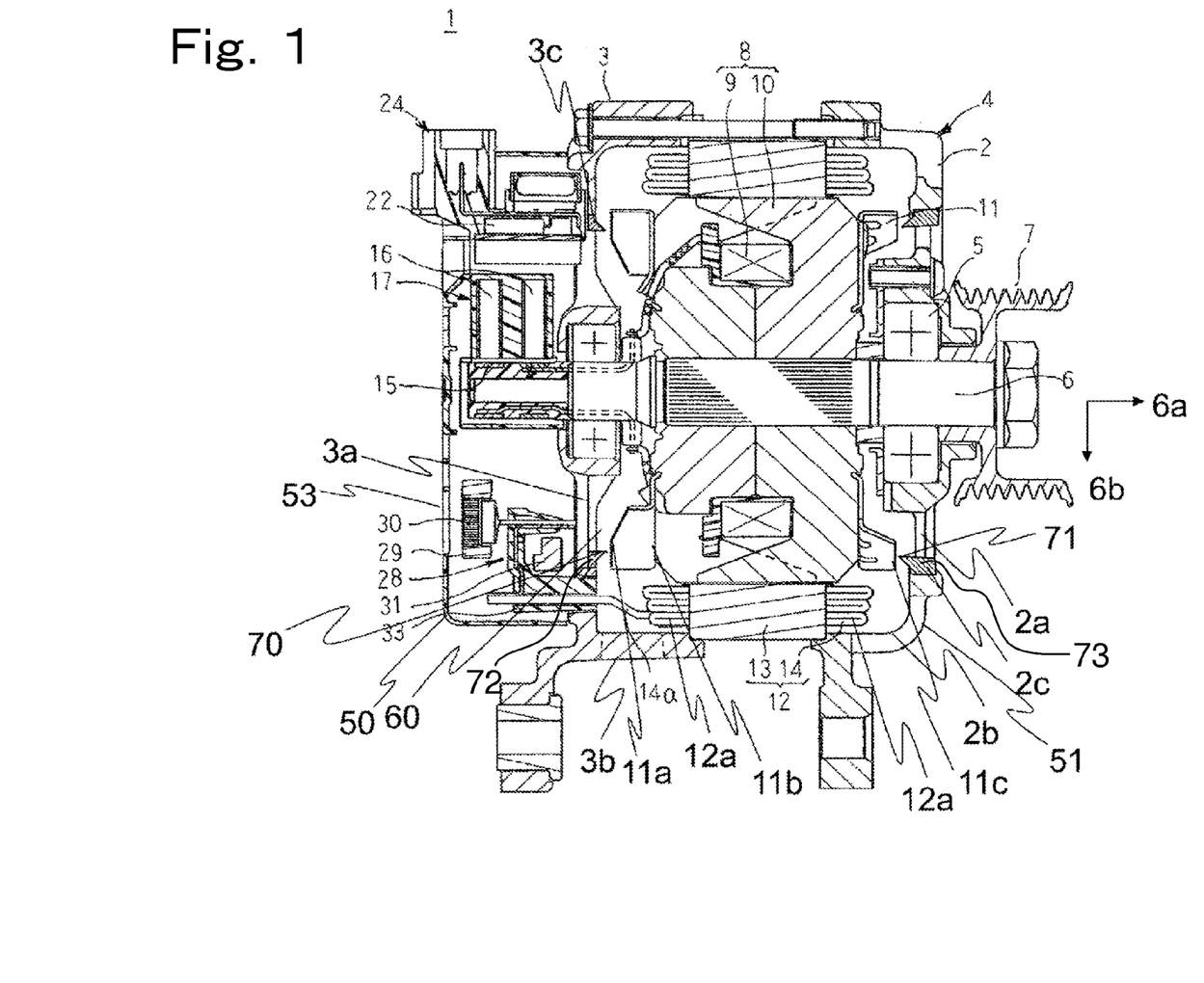
FIG. 1 is a cross section of a vehicle AC generator according to a first embodiment of the invention.
Figure 2:
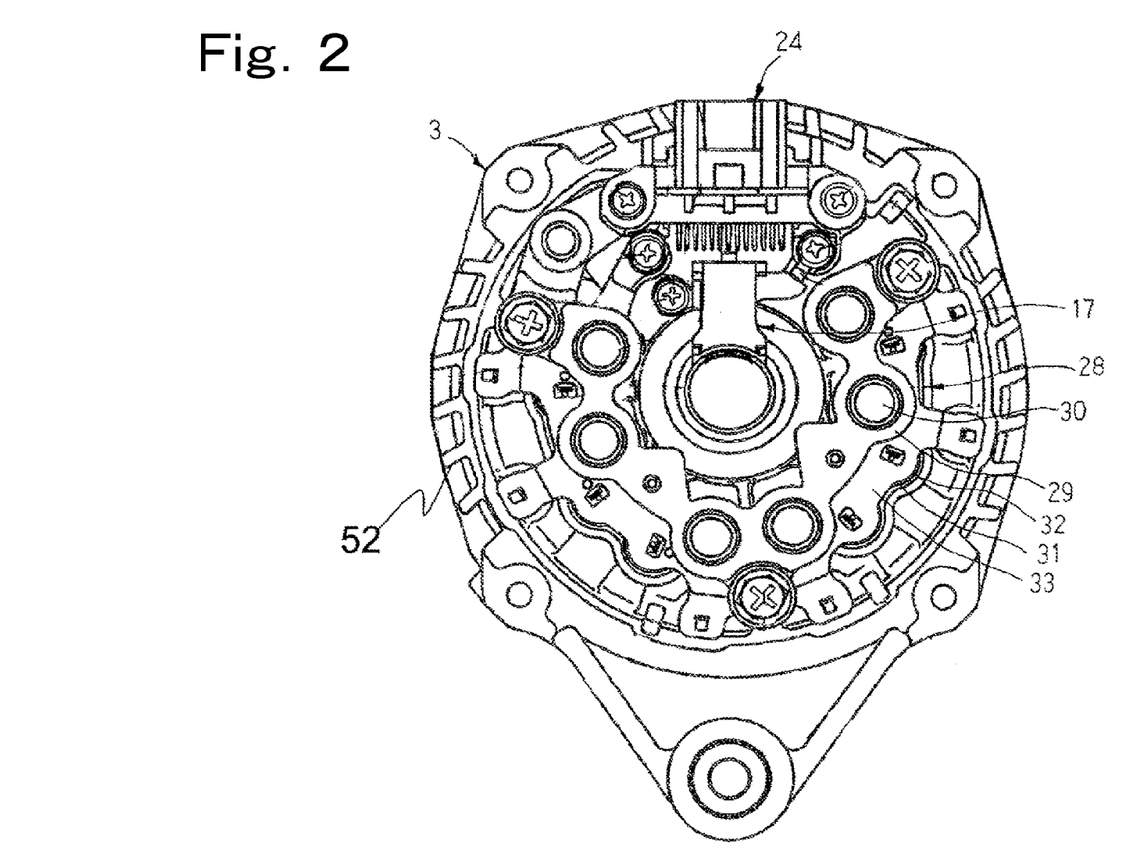
FIG. 2 is a rear end view showing a protection cover unattached state of the vehicle AC generator according to the first embodiment of the invention.

FIG. 1 is a cross section of a vehicle AC generator according to a first embodiment of the invention. FIG. 2 is a rear end view showing a protection cover unattached state of the vehicle AC generator according to the first embodiment of the invention.

Hereinafter, a configuration and an operation of the AC generator of the first embodiment will be described in detail with reference to the drawings. Referring to FIG. 1 and FIG. 2, the vehicle AC generator 1 includes a casing 4 formed of a front bracket 2 and a rear bracket 3 both of which are of a cup shape and made of aluminum.

The AC generator 1 also includes a shaft 6 supported on the casing 4 in a rotatable manner via a pair of bearings 5, a pulley 7 firmly fixed to the shaft 6 at an end extending frontward with respect to the casing 4, and a rotor 8 fixed to the shaft 6 and installed in the casing 4.

The AC generator 1 further includes fans 11 fixed to the rotor 8 on both end faces in an axial direction 6a, a stator 12 fixed to the casing 4 so as to surround the rotor 8, a pair of slip rings 15 fixed to the shaft 6 in an extending portion extending rearward with respect to the casing 4 and supplying the rotor 8 with a current, a pair of brushes 16 sliding on surfaces of the respective slip rings 15, and a brush holder 17 in which to store the brushes 16.

The AC generator 1 furthermore includes a voltage adjustor 22 installed on the rear side of the rear bracket 3 and adjusting magnitude of an AC voltage generated at the stator 12, a connector 24 installed on the rear side of the rear bracket 3, through which signals are inputted and outputted between the voltage adjustor 22 or the like and an outside device (not shown), a rectifier device 28 installed on the rear side of the rear bracket 3 and rectifying an AC voltage generated at the stator 12 to a DC voltage, and a protection cover 50 attached to the rear bracket 3 so as to cover the brush holder 17, the voltage adjustor 22, and the rectifier device 28.

The rotor 8 is a Lundell type rotor and includes a field winding 9 generating a flux when an excitation current is flown through and a pole core 10 provided so as to cover the field winding 9 and on which magnetic poles are generated by the flux.

The stator 12 includes a cylindrical stator core 13 and a stator winding 14 coiled around the stator core 13 and generating AC with a variance of the flux from the field winding 9 in association with rotations of the rotor 8. Further, the stator 12 is installed so as to surround the rotor 8 while the stator core 13 is pinched at opening ends of the front bracket 2 and the rear bracket 3 from both sides in the axial direction.

The rectifier device 28 includes a positive-electrode-side heat sink 29 on which multiple positive-electrode-side rectifier elements 30 are mounted, a negative-electrode-side heat sink 31 on which multiple negative-electrode-side rectifier elements 32 are mounted, and a circuit board 33. The circuit board 33 is sandwiched between the positive-electrode-side heat sink 29 and the negative-electrode-side heat sink 31 substantially in the shape of a capital C. The circuit board 33 is molded from insulating resin, such as PBT.

The positive-electrode-side rectifier elements 30 and the negative-electrode-side rectifier elements 32 are connected so as to form a predetermined bridge circuit via an electric conductor insert-molded in the circuit board 33.

An operation of the vehicle AC generator 1 will now be described. The vehicle AC generator 1 operates as a three-phase AC generator with 12 magnetic poles and 36 slots. It should be appreciated, however, that the numbers of the magnetic poles and the slots are not limited to those specified above.

In the vehicle AC generator 1, a flux is generated as a current is supplied from a battery (not shown) to the field winding 9 of the rotor 8 via the brushes 16 and the slip rings 15. With this flux, N-poles and S-poles are generated on an outer peripheral surface of the pole core 10 alternately in a circumferential direction.

On the other hand, the rotor 8 is rotated as a rotational torque of the engine is transmitted from an output shaft of the engine to the shaft 6 via a belt and the pulley 7. Hence, a rotational field is given to the stator winding 14 of the stator 12 and an electromotive force is generated at the stator winding 14. An AC current generated by this electromotive force is rectified by the rectifier device 28 and charged to the battery or supplied to an electric load.

The fans 11 rotate in association with rotations of the rotor 8. On the front side, cooling air is sucked into the front bracket 2 from a front-side inlet 2a and flown in the axial direction to the vicinity of the rotor 8. Then, the cooling air is bent in a centrifugal direction by the fan 11 in the vicinity of the rotor 8 and discharged from a front-side outlet 2b.

On the rear side, the cooling air is sucked into the protection cover 50 from multiple outlets 53 provided to the protection cover 50 and flown to the rear bracket 3 by passing through spaces among radiation fins provided to the positive-electrode-side heat sink 29 and the negative-electrode-side heat sink 31. Subsequently, the cooling air is sucked into the rear bracket 3 from a rear-side inlet 3a and flown in the axial direction 6a to the vicinity of the rotor 8. Then, the cooling air is bent in the centrifugal direction by the fan 11 in the vicinity of the rotor 8 and discharged from a rear-side outlet 3b.

A part of heat generated at the stator 12 is released from a coil end 12a by the cooling air flowing out from the fans 11 and headed for the front-side outlet 2b and the rear-side outlet 3b.

Also, another part of heat at the stator 12 is transmitted to the front bracket 2 and the rear bracket 3 and released to the cooling air from multiple front-side ribs 51 of the front-side outlet 2b and rear-side ribs 52, so that the stator 12 is cooled. In addition, the positive-electrode-side rectifier elements 30 and the negative-electrode-side rectifier elements 32 are cooled by the cooling air flowing through spaces among the radiation fins provided to the positive-electrode-side heat sink 29 and the negative-electrode-side heat sink 31.

A structure and an operation on the periphery of the rear bracket 3 and the fan 11 will now be described. There is a clearance 60 between a tip end 11a of the rotating fan 11 and the stationary rear bracket 3. Herein, a pressure is low on the side of the shaft 6 of the fan 11 and a pressure is high on the side of the rear bracket outlet 3b. A leakage flow is therefore generated in the clearance 60 from the rear-side outlet 3b toward the shaft 6.

As an amount of the leakage flow increases, an amount of air cooling the stator 12, the positive-electrode-side rectifier elements 30, and the negative-electrode-side rectifier elements 32 decreases. Hence, temperatures of the stator 12, the positive-electrode-side rectifier elements 30, and the negative-electrode-side rectifier elements 32 rise and an amount of power generation of the AC generator 1 decreases.

In order to reduce an amount of the leakage flow in the clearance 60, the rear bracket 3 and the tip end 11a of the fan 11 are opposed in parallel to each other so that the clearance 60 is reduced to the minimum. This configuration can reduce an amount of the leakage flow. However, this configuration has a problem that a high pressure side and a low pressure side are formed on a vane surface of the rotating fan 11, and pressures on these sides propagate to the rear bracket 3 and give rise to a fluctuation of the pressure on the surface of the rear bracket 3, which results in large noises.

On the other hand, in the typical vehicle AC generator 1, a lead 14a is connected from the coil end 12a of the stator 12 to the rectifier device side, and the presence of the lead 14a reduces an area of a passage of air flowing out from the fan 11. The tip end of the coil end 12a also reduces the area of the passage of air flowing out from the fan 11 in some cases due to its location closer to the tip end 11a of the fan 11 in the axial direction 6a than to a bottom surface 11b of the fan 11. When the area of the passage of air flowing out from the fan 11 is reduced, an amount of air to cool the stator 12, the positive-electrode-side rectifier elements 30, and the negative-electrode-side rectifier elements 32 is decreased. Hence, temperatures of the stator 12, the positive-electrode-side rectifier elements 30, and the negative-electrode-side rectifier elements 32 rise and an amount of power generation of the vehicle AC generator 1 decreases.

A structure on the periphery of the rear bracket 3 and the fan 11 according to the first embodiment of the invention will now be described.

Figure 3:
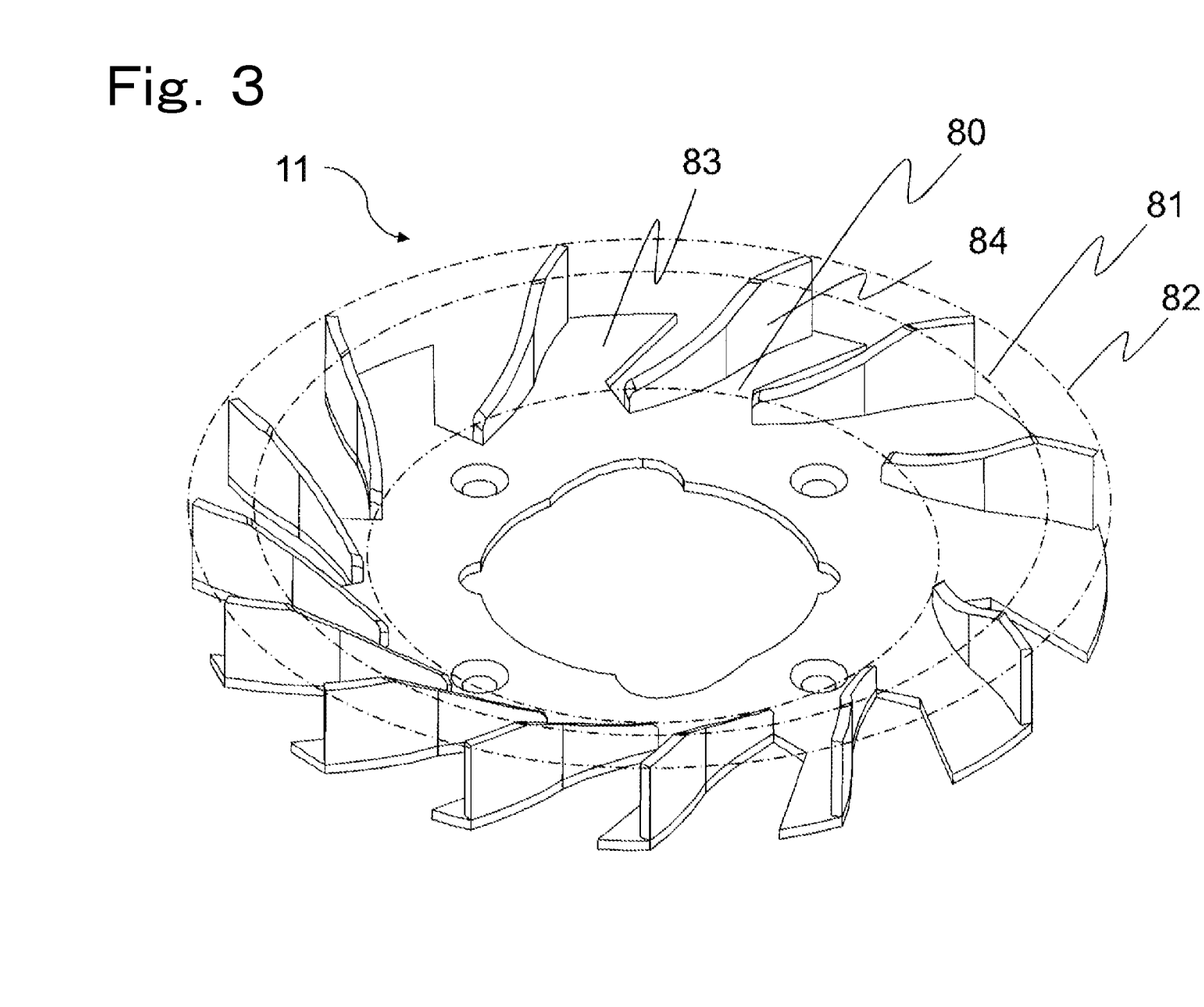
FIG. 3 is a perspective view of a fan of the vehicle AC generator according to the first embodiment of the invention.

FIG. 3 is a perspective view of a fan of the vehicle AC generator according to the first embodiment of the invention. Referring to FIG. 3, the fan 11 includes a fan main body 83 and multiple vanes (blades) 84 provided to the fan main body 83. Each of the multiple vanes 84 has a portion 81 having a maximum vane height somewhere between an inner periphery 80 and an outer periphery 82 of the fan main body 83. The vane 84 also has a constant height from the portion 81 having the maximum vane height to the outer periphery 82.

Figure 4:
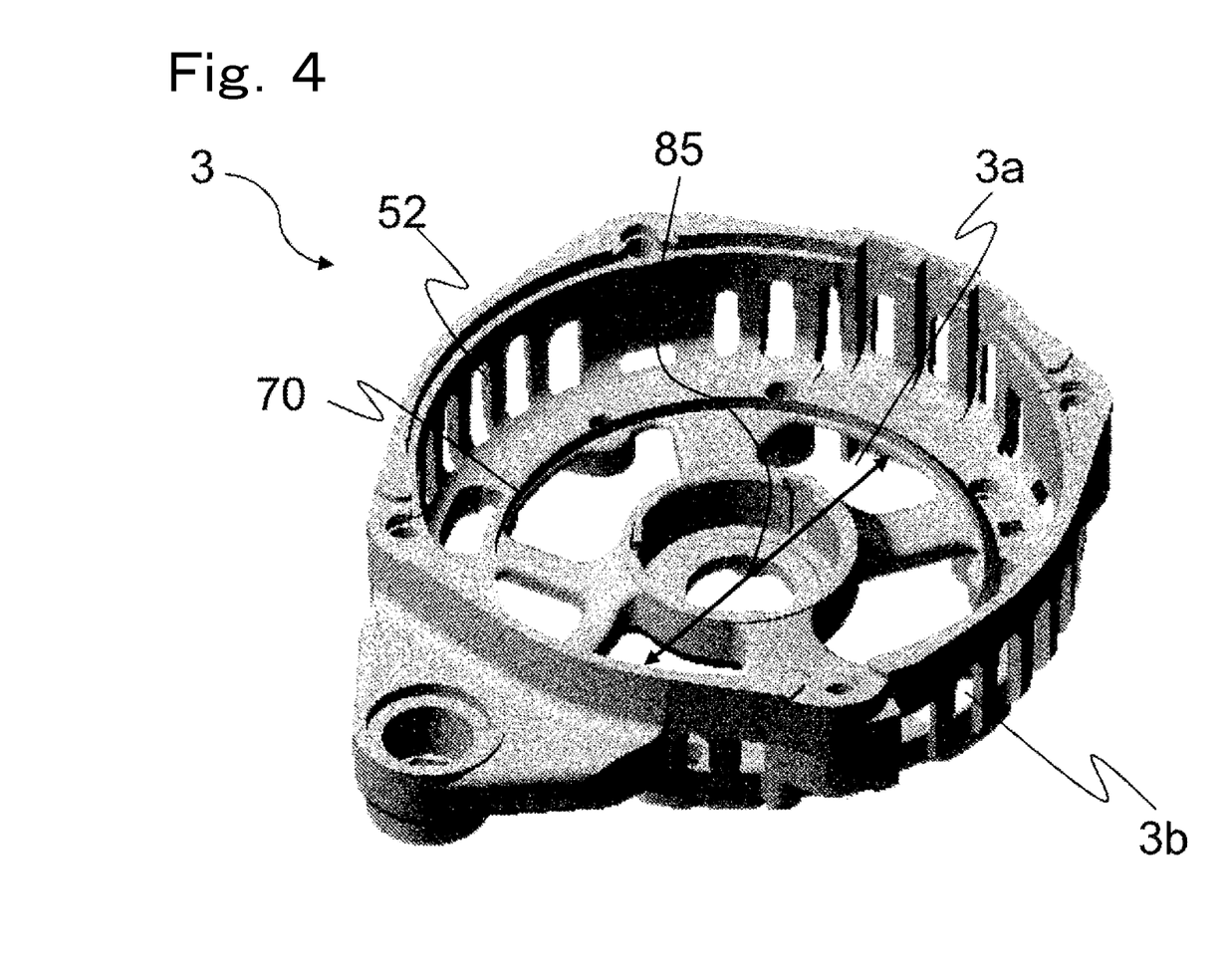
FIG. 4 is a perspective view of a rear bracket of the AC generator according to the first embodiment of the invention.

FIG. 4 is a perspective view of the rear bracket of the vehicle AC generator according to the first embodiment of the invention. The rear bracket 3 includes multiple inlets 3a to let the cooling air in. Also, the rear bracket 3 includes outlets 3b partitioned by the ribs 52. A diameter 85 of the outer periphery of the multiple inlets 3a of the rear bracket 3 is formed to be smaller than a diameter of the outer periphery of the fan 11. Also, the vane height of the fan 11 at a position in a radial direction 6b of the outer periphery of the inlets 3a has the portion 81 having the maximum vane height. The diameter 85 of the outer periphery of the inlets 3a of the rear bracket 3 is formed to be larger than a diameter of a periphery of the fan 11, which forms the portion 81 having the maximum vane height.

Referring to FIG. 1 again, in addition to the configuration described above, the AC generator 1 of the first embodiment includes a protrusion 72 on a surface of the rear bracket 3 opposing the tip end 11a of the fan 11 at a position adjacent to the outer periphery of the inlets 3a of the rear bracket 3.

An end portion 70 of the rear bracket 3 on the side of the fan 11 is parallel to the axial direction 6a of the shaft 6 and in closest proximity to the fan 11. The protrusion 72 inclines from the end portion 70 to the radial direction 6b so as to move away from the fan 11. Owing to the configuration as above, the protrusion 72 having a right-angled triangular cross section is formed on the surface of the rear bracket 3 opposing the tip end 11a of the fan 11 at a position adjacent to the outer periphery of the inlets 3a of the rear bracket 3.

By configuring in this manner, a distance between the tip end 11a on the outer periphery of the fan 11 and the rear bracket 3 can be increased and hence the area of the outlets 3b can be increased.

Accordingly, the area of the air passage of the cooling air blocked by the lead 14a and the coil end 12a can be increased. Hence, a pressure loss is lessened and an air volume generated by the fan 11 is increased. It thus becomes possible to lower temperatures of the positive-electrode-side rectifier elements 30 and the negative-electrode-side rectifier elements 32.

Also, momentum is given to the cooling air by the fan 11 while flowing from the major diameter of the inlets 3a to the major diameter of the fan 11 and a pressure rises as a result. By aligning the outer side surface (outer peripheral side surface) of the inlets 3a parallel to the axial direction 6a, a distance between the major diameter of the inlets 3a and the major diameter of the fan 11 can be increased and the pressure can be raised as a result. Hence, even in a case where there is a large pressure loss at the heat sink due to the cooling of the positive-electrode-side rectifier elements 30 and the negative-electrode-side rectifier elements 32, the pressure can be raised by the fan 11. It thus becomes possible to lower the temperatures of the positive-electrode-side rectifier elements 30 and the negative-electrode-side rectifier elements 32.

Also, by configuring in such a manner as in this embodiment that the tip end 11a of the fan 11 and the rear bracket 3 are in close proximity to each other in the vicinity of the end portion 70 whereas a distance between the tip end 11a and the rear bracket 3 increases toward the outer periphery of the fan 11, a fluctuation of the pressure on the surface of the rear bracket 3, which is the source of noises, can be reduced. It thus becomes possible to increase an air volume of the cooling air by suppressing an amount of the leakage flow without increasing noises.

A structure on the periphery of the front bracket 2 and the fan 11 of the first embodiment will now be described. Although the lead 14a is absent on the front side, there is the coil end 12a that reduces an area of the outlet port of the fan. Constituent members such that reduce the area of the outlet port of the fan are fewer on the front side than on the rear side. It should be noted, however, that a cooling performance can be enhanced by a structure that increases the area of the outlet port of the fan on the front side in the same manner as on the rear side.

The structure of the fan 11 on the front side is the same as the structure of the fan on the rear side shown in FIG. 3. Herein, the description of the structure of the fan shown in FIG. 3 is not repeated. It should be appreciated, however, that the multiple vanes (blades) 84 of the fan 11 may have a constant vane height from the inner periphery 80 to the outer periphery 82 of the fan 11.

A diameter of the outer periphery of the inlets 2a of the front bracket 2 is formed to be smaller than the diameter of the outer periphery of the fan 11. A vane height of the fan 11 at a position in the radial direction 6b of the outer periphery of the inlets 2a has a portion having the maximum vane height.

Referring to FIG. 1 again, the outer peripheral side surface of the inlets 2a of the front bracket 2 is parallel to the axial direction 6a of the shaft 6. Hence, an end portion 71 of the inlets 2a in the outer peripheral surface on the side of the fan 11 is in closest proximity to the fan 11. The protrusion 73 gradually inclines from the end portion 71 to the radial direction 6b so as to move away from the fan 11. Owing to the configuration as above, a protrusion 73 is formed on a surface of the front bracket 2 opposing a tip end 11c of the fan 11 at a position adjacent to the inlets 2a on the periphery of the front bracket 2. The protrusion 73 is of a right-angled triangular shape in cross section.

When configured in this manner, a distance between the tip end 11c on the outer periphery of the fan 11 and the front bracket 2 can be increased and hence the area of the outlets 2b can be increased.

Accordingly, the area of the air passage of the cooling air blocked by the coil end 12a can be increased. Hence, a pressure loss is reduced and an air volume generated by the fan 11 is increased. It thus becomes possible to lower temperatures of the bearings 5 and the stator 12.

Also, momentum is given to the cooling air by the fan 11 while flowing from a major diameter of the inlets 2a to the major diameter of the fan 11 and a pressure rises as a result. By aligning the outer side surface of the inlets 2a parallel to the axial direction 6a, a distance between the major diameter of the inlets 2a and the major diameter of the fan 11 is increased and a pressure can be raised as a result.

Accordingly, even in a case where the tip end of the coil end 12a extends in the axial direction 6a and is positioned flush with the fan tip end 11c or where the area of the inlets 2a is reduced due to multiple ribs provided to the inlets 2a, a pressure can be raised by the fan 11. It thus becomes possible to lower the temperatures of the bearings 5 and the stator 12.

The tip end 11c of the fan 11 and the front bracket 2 are in close proximity to each other in the vicinity of the end portion 71 whereas a distance between the tip end 11c and the front bracket 2 increases toward the outer periphery of the fan 11. Owing to this configuration, a fluctuation of the pressure on the surface of the front bracket 2, which is the source of noises, can be reduced. It thus becomes possible to increase an air volume of the cooling air by suppressing an amount of the leakage flow without increasing noises.

Second Embodiment

Figure 5:
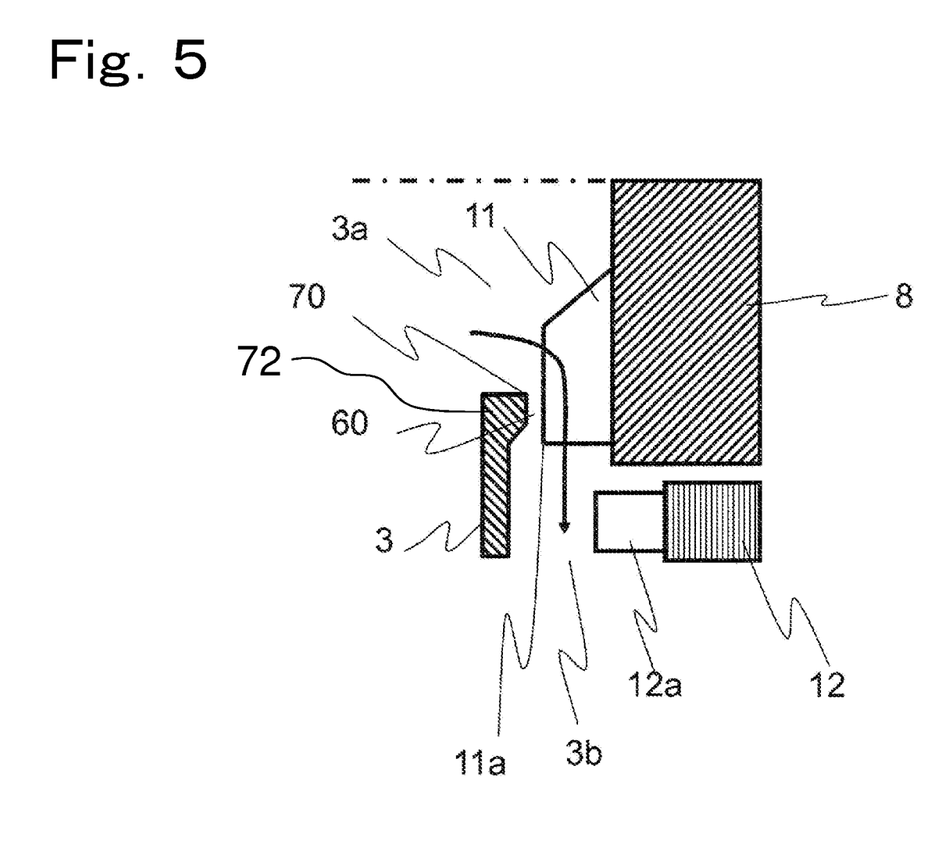
FIG. 5 is a cross section of a major portion in an AC generator according to a second embodiment of the invention.

FIG. 5 is a cross section of a major portion in an AC generator of a second embodiment. Reference numerals of FIG. 5 same as those of the first embodiment above denote the counterparts of the first embodiment above and a description is omitted herein. Also, an arrow indicates a flow of air from inlets 3a to outlets 3b.

On the rear side, in a case where there is a large pressure loss at the heat sink due to the cooling of positive-electrode-side rectifier elements 30 and negative-electrode-side rectifying members 32, a pressure generated by the fan is increased, and so is a pressure difference between the vicinity of the center and the vicinity of the outlet port of the fan. When a pressure difference is increased, a leakage flow from the outlets 3b toward the inlets 3a of the rear bracket 3 in the vicinity of the clearance 60 is increased and hence an air volume of the cooling air is reduced in some cases.

Herein, a description will be given to a structure on the periphery of the fan 11 in a case where a pressure generated by the fan is large with reference to FIG. 5. The fan 11 includes a fan main body 83 and multiple vanes (blades) 84 provided to the fan main body 83. Each of the multiple vanes 84 has a portion 81 having a maximum vane height somewhere between an inner periphery 80 and an outer periphery 82 of the fan main body 83. Also, the vane 84 has a constant height from the portion 81 having the maximum vane height to the outer periphery 82.

The rear bracket 3 includes multiple inlets 3a to let the cooling air in. Also, the rear bracket 3 includes outlets 3b partitioned by ribs 52. A diameter of an outer periphery of the inlets 3a of the rear bracket 3 is formed to be smaller than a diameter of an outer periphery of the fan 11.

Also, the vane height of the fan 11 at a position in a radial direction 6b of the outer periphery of the inlets 3a has the portion 81 having the maximum vane height. An outer peripheral side surface of the inlets 3a of the rear bracket 3 is parallel to the axial direction 6a of the shaft 6. Hence, an end portion 70 of the inlets 3a in the outer peripheral surface on the side of the fan 11 is in closest proximity to the fan 11. From the end portion 70 to the radial direction 6b, the protrusion 72 has a portion parallel to the tip end 11a of the fan 11 and a portion inclined so as to move away from the fan 11. When configured in this manner, a protrusion 72 having a trapezoidal cross section is formed on the outer periphery of the rear bracket 3 adjacently to the inlets 3a.

In the first embodiment above, the clearance 60 reaches the minimum in the vicinity of the end 70 of the rear bracket 3 whereas the clearance 60 increases to the radial direction 6b. In the second embodiment, the clearance 60 is constant from the end portion 70 of the rear bracket 3 to the radial direction 6b and the clearance 60 starts to increase from a position within the diameter of the outer periphery of the fan 11.

A range in which the clearance 60 is the minimum is extended in the radial direction 6b in comparison with the first embodiment above. Hence, a resistance is increased against a flow flowing backward from a high-pressure region at the outlet port of the fan 11 to a low-pressure region at the inlets 3a of the rear bracket 3 by passing the clearance 60. A flow rate of the back flow can be thus suppressed.

Consequently, an air volume of the cooling air is increased and it becomes possible to lower temperatures of the positive-electrode-side rectifier elements 30 and the negative-electrode-side rectifier elements 32.

When configured in this manner, a distance between the tip end 11a on the outer periphery of the fan 11 and the rear bracket 3 can be increased. Consequently, a length of the outlets 3b of the rear bracket 3 in the axial direction 6a is extended and hence an area of the outlets 3b can be increased.

Accordingly, an area of the air passage of the cooling air blocked by the lead 14a and the coil end 12a can be increased. Hence, a pressure loss is lessened and an air volume generated by the fan 11 is increased. It thus becomes possible to lower the temperatures of the positive-electrode-side rectifier elements 30 and the negative-electrode-side rectifier elements 32.

Also, momentum is given to the cooling air by the fan 11 while flowing from the outer periphery of the inlets 3a to the outer periphery of the fan 11 and a pressure rises as a result. By aligning the outer side surface of the inlets 3a parallel to the axial direction 6a, a distance between the diameter of the outer periphery of the inlets 3a and the major diameter of the fan 11 can be increased and the pressure can be raised as a result.

Accordingly, even in a case where there is a large pressure loss at the heat sink due to the cooling of the positive-electrode-side rectifier elements 30 and the negative-electrode-side rectifier elements 32, a pressure can be raised by the fan 11. It thus becomes possible to lower the temperatures of the positive-electrode-side rectifier elements 30 and the negative-electrode-side rectifier elements 32.

In the second embodiment, the tip end 11a of the fan 11 and the inlets 3a of the rear bracket 3 are in close proximity to each other in the vicinity of the end portion 70 whereas a distance between the tip end 11a and the rear bracket 3 increases toward the outer periphery of the fan 11. Owing to this configuration, a fluctuation of the pressure on the surface of the rear bracket 3, which is the source of noises, can be reduced. It thus becomes possible to increase an air volume of the cooling air by suppressing an amount of the leakage flow without increasing noises.

The above has described as to a shape of the rear-side inlets 3a on the side of the fan 11 that the protrusion 72 having a trapezoidal cross section is formed on the outer periphery of the inlets 3a. It should be appreciated, however, that the same advantages can be obtained even when the cross section is formed in a rectangular shape.

Third Embodiment

Figure 6:
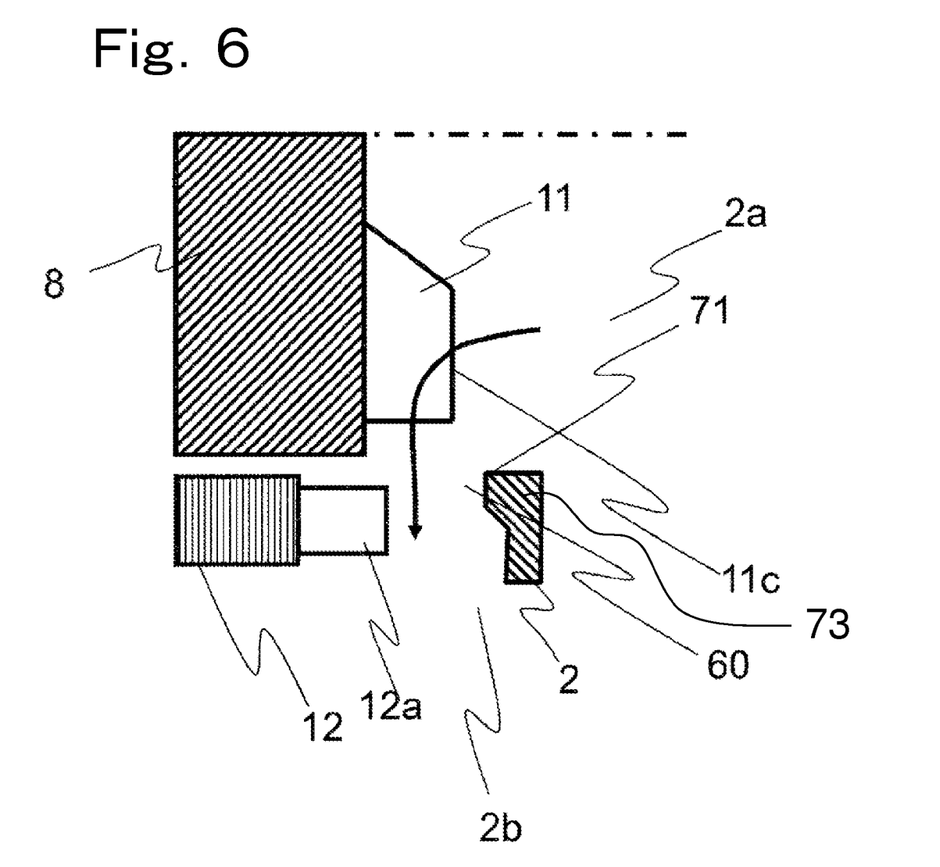
FIG. 6 is a cross section of a major portion in an AC generator according to a third embodiment of the invention.

FIG. 6 is a cross section of a major portion in an AC generator according to a third embodiment of the invention. Reference numerals same as those of the first embodiment above denote the counterparts of the first embodiment above and a description is omitted herein. Also, an arrow indicates a flow of air from inlets 2a to outlets 2b.

The second embodiment above has described a case where a high pressure is required on the rear side. On the other hand, fins (not shown) are provided on the front side in order to increase the strength of the inlets 2a and the outlets 2b and also to release heat. When the number of the fins is small and the fins are short, a pressure is not required on the front side in comparison with the rear side. A structure to increase the cooling air on the front side will now be described with reference to FIG. 6.

In a case where a pressure is not required, no pressure difference is generated between the vicinity of the center and the outlet port of the fan. Hence, there is substantially no leakage flow from the outlet port toward the vicinity of the center of the fan. Accordingly, there is no need to provide a difference like a relation between the diameter of the outer periphery of the inlets and the diameter of the outer periphery of the fan as described in the first embodiment above. Each of the multiple vanes 84 of the fan 11 has a portion 81 having a maximum vane height somewhere between an inner periphery 80 and an outer periphery 82 of the fan main body 83. Also, the vane 84 has a constant height from the portion 81 having the maximum height to the outer periphery 82.

Also, in the third embodiment, as is shown in FIG. 6, a diameter of the outer periphery of the inlets 2a of the front bracket 2 is formed to be larger than a diameter of the outer periphery of the fan 11. An outer peripheral side surface of the inlets 2a of the front bracket 2 is parallel to the axial direction 6a of the shaft 6. Accordingly, an end portion 71 of the inlets 2a in the outer peripheral surface on the side of the fan 11 is in closest proximity to the fan 11. From the end portion 71 to the radial direction 6b, the protrusion 73 has a portion parallel to the tip end 11c of the fan 11 and a portion inclined so as to move away from the fan 11.

When configured as above, a protrusion 73 having a trapezoidal cross section is formed on the outer periphery of the front bracket 2 adjacently to the inlets 2a of the front bracket 2 on the side of the fan 11.

Owing to this configuration, an area of the outlets 2b can be increased and also it becomes difficult for the cooling air flowing out from the fan 11 to flow toward the inlets 2a. Consequently, an air volume of the cooling air is increased and it becomes possible to lower temperatures of the bearings 5 and the stator 12. The third embodiment has described the protrusion 73 having a trapezoidal cross section. It should be appreciated, however, that the same advantages can be obtained even when the protrusion 73 has a triangular cross section.

It should be understood that the respective embodiments of the invention can be combined without restrictions and modified and omitted when the need arises within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. An AC generator, comprising:
a casing having an outlet on an outer periphery and an inlet at an end part in an axial direction;
a stator installed in the casing;
a rotor supported in the stator in a rotatable manner;
a fan installed oppositely to the inlet in the casing and rotated integrally with the rotor; and
a protrusion formed on a surface of the casing opposing a tip end of the fan at a position adjacent to an outer periphery of the inlet of the casing,
wherein the fan has a fan main body and multiple vanes provided to the fan main body,
wherein each of the multiple vanes has a portion having a maximum height of the vanes at a point between an inner periphery and an outer periphery of the fan main body,
wherein the casing has multiple inlets including the inlet at the end part in the axial direction,
wherein a diameter of an outer periphery of the multiple inlets of the casing is larger than a diameter of a periphery of the fan, which forms the portion having the maximum height of the vanes, and
wherein an end portion of the protrusion on a side of the fan is extended toward the fan to be parallel to the axial direction of the rotor.

2. The AC generator according to claim 1, wherein:
the end portion of the protrusion on the side of the fan is in proximity to the fan; and
the protrusion is inclined from the end portion of the protrusion to a radial direction of the rotor so as to move away from the fan.

3. The AC generator according to claim 2, wherein:
the protrusion has a triangular cross section.

4. The AC generator according to claim 1, wherein:
the protrusion has a portion parallel to a tip end of the fan and the axial direction of the rotor and a portion inclined from the end portion of the protrusion to a radial direction of the rotor so as to move away from the fan.

5. The AC generator according to claim 4, wherein:
the protrusion has a trapezoidal cross section.

6. The AC generator according to claim 1, wherein:
the protrusion has a rectangular cross section and a surface parallel to a side surface of the inlet.

7. The AC generator according to claim 1, wherein:
the vane has a constant height from the portion to the outer periphery.

8. The AC generator according to claim 1, wherein:
the casing is a rear bracket and the diameter of the outer periphery of the multiple inlets of the rear bracket is smaller than a diameter of an outer periphery of the fan.

9. The AC generator according to claim 1, wherein:
the casing is a front bracket and the diameter of the outer periphery of the multiple inlets of the front bracket is larger than a diameter of an outer periphery of the fan.

10. The AC generator according to claim 1, wherein a clearance exists between a tip end of the fan and a rear bracket on which the protrusion is formed, and the clearance is constant, in a radial direction of the rotor, from the end portion of the protrusion to a position within the diameter of an outer periphery of the fan and then starts to increase from the position within the diameter of the outer periphery.

\* \* \* \* \*